United States Patent [19]

Hardin

[11] 3,800,862

[45] Apr. 2, 1974

[54] TIME SCHEDULE CONTROLLER AND PARTS AND SYSTEM THEREFOR

[75] Inventor: George T. Hardin, Knoxville, Tenn.

[73] Assignee: Robertshaw Controls Company, Richmond, Va.

[22] Filed: Feb. 20, 1973

[21] Appl. No.: 333,668

Related U.S. Application Data

[62] Division of Ser. No. 187,641, Oct. 8, 1971, Pat. No. 3,730,427.

[52] U.S. Cl. .................................................. 165/12
[51] Int. Cl. ........................................... G05b 19/04
[58] Field of Search .......... 236/46; 219/492; 165/12

[56] References Cited
UNITED STATES PATENTS
2,319,114    5/1943    Cook .................................... 236/46

2,347,344    4/1944    Waidelich .......................... 236/46 X

Primary Examiner—William E. Wayner
Attorney, Agent, or Firm—Candor, Candor & Tassone

[57] ABSTRACT

A time schedule controller wherein the high limit index and the set point index respectively have members movable therewith and alignable in relation to each other only when the set point index reaches the setting of the high limit index. An actuator for terminating the operation of the set point index in the rate of rise thereof is only actuated when the alignable members of the high limit index and the set point index that are operatively associated therewith are in their aligned relation thereof.

10 Claims, 15 Drawing Figures

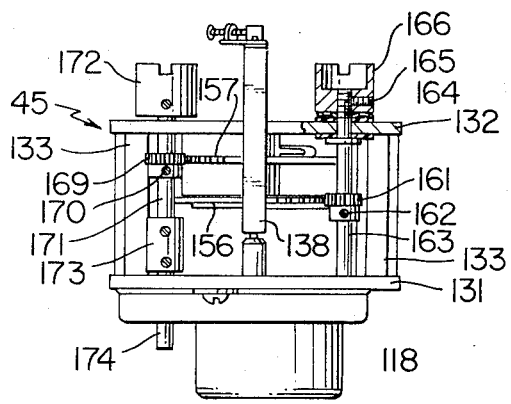
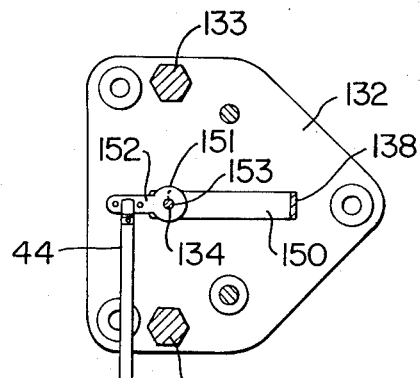
FIG. 8　　　　FIG. 7
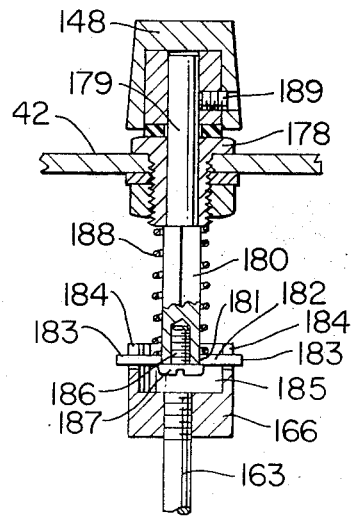
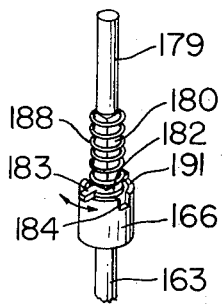
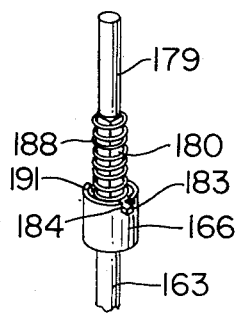
FIG. 9　　　FIG.10　　　FIG.11
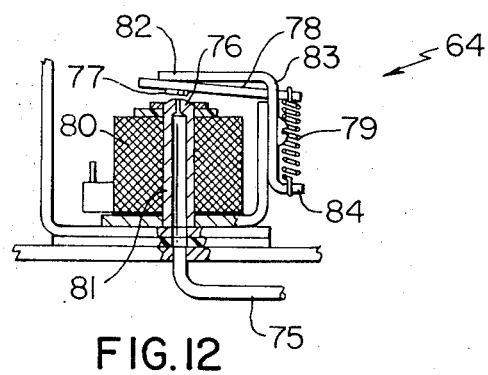
FIG.12

3,800,862

TIME SCHEDULE CONTROLLER AND PARTS AND SYSTEM THEREFOR

This is a division, of application Ser. No. 187,641, filed Oct. 8, 1971, now U.S. Pat. No. 3,730,427.

BACKGROUND OF THE INVENTION

Time schedule controllers have been provided wherein each controller is adapted to be set for an initial starting condition of and for a controlled rate of rise of a set point index thereof so that a controlled device, such as a heat exchanger, will have the output effect thereof controlled at the rate of rise of the set point index thereof until the set point index reaches a set high limit index point at which time the controller will automatically cause the output effect of the controlled device to remain at the high limit thereof for a period of time as set by a hold timer of the controller followed by an automatic shutdown of the operation of the controlled device at the end of the predetermined hold period of the controller. Various means have been provided in such time schedule controllers to accomplish these automatic functions.

SUMMARY

This invention provides an improved time schedule controller of the above-described type having improved means for controlling the manual or automatic sequence of operation thereof.

This invention also provides an improved time schedule controlled system as well as improved parts for such a time schedule controller or the like.

In particular, one embodiment of the time schedule controller of this invention, wherein a high limit index is adapted to be set at a desired condition and the rate of rise of the set point index is adapted to be selected so that the controller will tend to maintain an output effect of a controlled device at the selected rate of rise of the set point index until the output effect reaches the set condition of the high limit index, comprises means movable with the high limit index and the set end point index and alignable in relation to each other only when the set point index reaches the setting of the set high limit index. Actuator means are provided for terminating the operation of the set point index in the rate of rise thereof when the actuator means is actuated, the alignable means of the high limit index and the set point index being operatively associated with the actuator means to actuate the same only when the alignable means are in the aligned relation thereof. In the embodiment of the time schedule controller of this invention, the alignable means of the set point index comprises a rotatable cam member movable in unison with the set point index and alignable means of the high limit of the set high limit index comprises an electric switch movable with the high limit index so that the cam member of the set point index will only actuate the electric switch when the same is aligned with the electric switch, as will be apparent hereinafter.

The time schedule controller of this invention also has improved means for setting the indexes thereof in the desired initial set positions thereof.

Accordingly, one of the objects of this invention is to provide an improved time schedule controller having one or more of the novel features set forth above or hereinafter shown or described.

Another object of this invention is to provide an improved time schedule controlled system utilizing such a time schedule controller or the like.

Another object of this invention is to provide improved parts for such a time schedule controller or the like.

Other objects, uses and advantages of this invention are apparent from a reading of this description, which proceeds with reference to the accompanying drawings forming a part thereof and wherein

DESCRIPTION OF THE DRAWINGS

FIG. 7 is a fragmentary, cross-sectional view taken on line 7—7 of FIG. 4.

FIG. 8 is an end view of the bridge and pen assembly of FIG. 3.

FIG. 9 is an enlarged, fragmentary, cross-sectional view taken on line 9—9 of FIG. 1 and illustrating the index adjusting means of the time schedule controller of this invention.

FIG. 10 is a fragmentary, perspective view illustrating the operation of the adjustment means of FIG. 9, with the adjustment means being in one position thereof.

FIG. 11 is a view similar to FIG. 10 and illustrates the adjustment means being in another position thereof.

FIG. 12 is a fragmentary, cross-sectional view illustrating a solenoid operated valve means for the control system of the time schedule controller of this invention.

DESCRIPTION OF ILLUSTRATED EMBODIMENT

Figure 2:
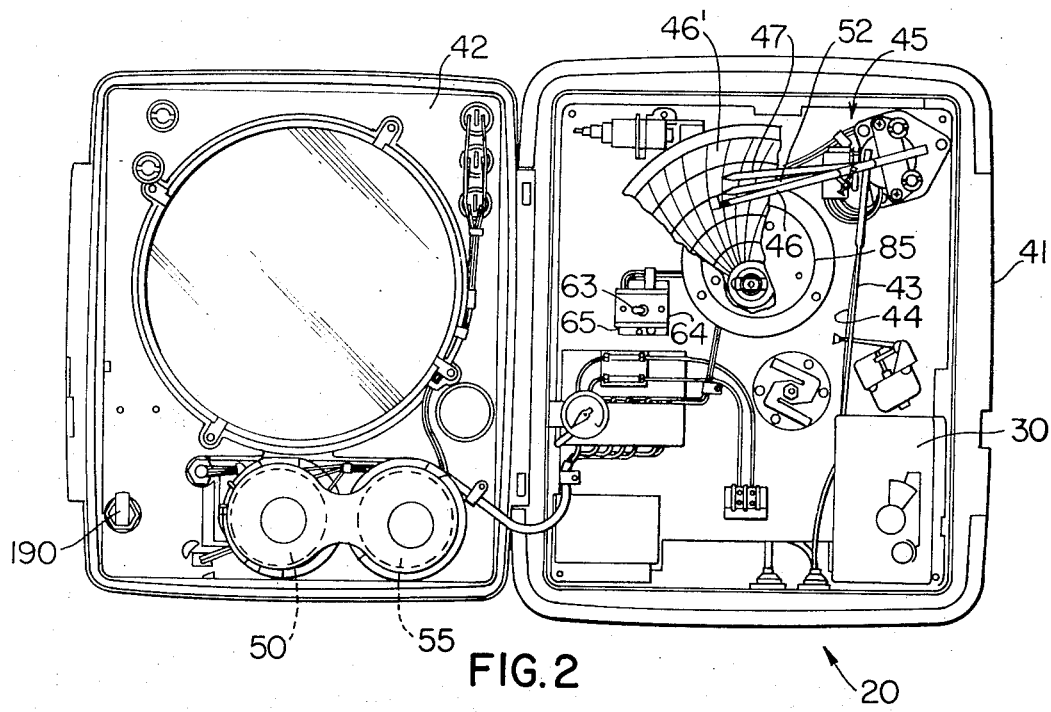
FIG. 2 is a view similar to FIG. 1, with the front cover of the time schedule controller in an open position thereof and with certain parts inside the time schedule controller being broken away.

While the various features of this invention are hereinafter described and illustrated as being particularly adapted to control the output temperature effect of a heat exchanger means, it is to be understood that the various features of this invention can be utilized singly or in any combination thereof to provide a time schedule control for other types of systems as desired.

Also, it is to be understood that the various parts of the time schedule controller of this invention can be utilized in other types of control instruments or devices, if desired.

Therefore, this invention is not to be limited to only the embodiment illustrated in the drawings, because the drawings are merely utilized to illustrate one of the wide variety of uses of this invention.

Figure 1:
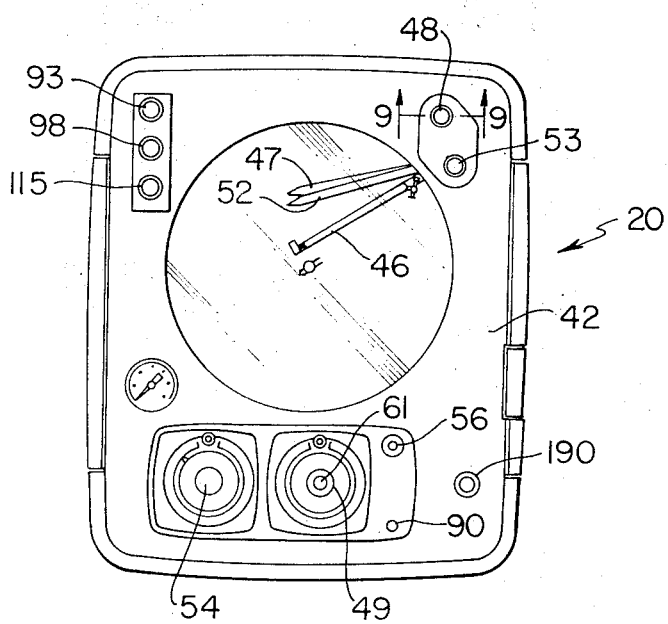
FIG. 1 is a front view of the time schedule controller of this invention.
Figure 3:
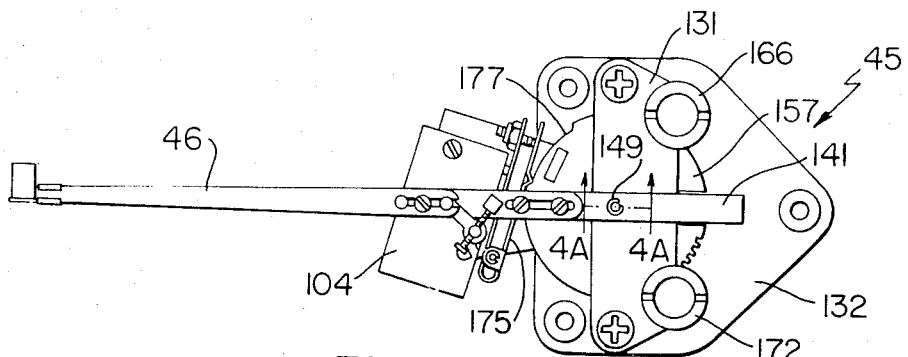
FIG. 3 is an enlarged, fragmentary view of the bridge and pen assembly of the controller of FIG. 1.
Figure 13:
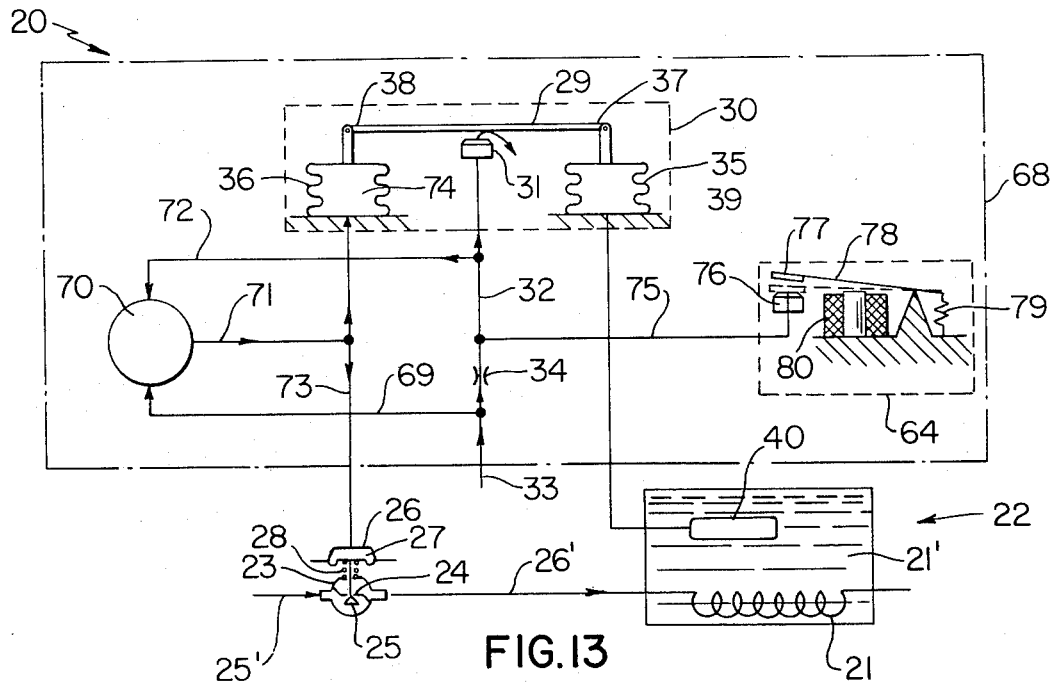
FIG. 13 is a schematic view illustrating the control system that is operated by the time schedule controller of this invention.

Referring now to FIGS. 1, 2 and 13, the time schedule controller of this invention is generally indicated by the reference numeral 20 and is utilized to control the output temperature effect of a heat exchanger 21, FIG. 13, forming part of the controlled system of this invention that is generally indicated by the reference numeral 22 in FIG. 13.

The controlled system 22 includes a main steam valve 23 having a valve seat 24 for interconnecting a source of steam 25 to a conduit 26 leading to the heating coil of the heat exchanger 21, the valve seat 24 being opened and closed by a valve member 25 being positioned relative to the valve seat 24 by a pneumatically operated actuator 26 in a manner well known in the art whereby an increase of pneumatic pressure in the chamber 27 of the pneumatically operated actuator 26 will cause the valve member 25 to be moved further away from the valve seat 24 to admit more steam to the heat exchanger 21 and, conversely, a decrease in the pneumatic pressure in the chamber 27 of the actuator 26 will cause the valve member 25 to be moved closer to the valve seat 24 under the force of a compression spring 28 to decrease the amount of steam being directed to the heat exchanger 21. Thus, the output temperature effect of the heat exchanger 21 increases as the valve member 25 moves farther away from the valve seat 24 and decreases as the valve member 25 moves toward the valve seat 24.

While the particular process being heated by the heat exchanger 21 can vary, the heat exchanger 21 in FIG. 13 is illustrated as heating a dye bath 21' for dyeing textiles and the like.

As illustrated in FIG. 13, the controller 20 for the system 22 includes a balance beam 29 of a proportional mechanism 30 that is well known in the art and is therefore schematically illustrated in FIG. 13 as having a vent opening device or nozzle 31 for a conduit 32 that is adapted to be supplied fluid pressure from an external source 33 and has a restrictor 34 therein. The balance beam 29 is positioned relative to the vent or nozzle opening 31 by a process bellows construction 35 and a feedback bellows construction 36 respectively interconnected to opposed ends 37 and 38 of the balance beam 29. The process bellows 35 has the fluid in the chamber 39 thereof adapted to be expanded and contracted in relation to the sensing of the output temperature effect of the heat exchanger 21 by the sensing bulb 40 disposed in the process bath 21'. Thus, should the output temperature effect of the heat exchanger 21 exceed the particular output temperature effect setting of the process bellows 35, the resulting expansion of the fluid in the chamber 39 causes the balance beam 29 to move away from the vent opening 31 a certain amount to vent a greater portion of the fluid pressure in the line 32 than before and, thus, causes a venting of some of the fluid pressure in the chamber 27 of the pneumatic actuator 26 for the valve means 23 in a manner more particularly hereinafter described so as to move the valve member 25 closer to the valve seat 24 and thereby decrease the amount of steam being directed to the heat exchanger 21 to tend to maintain the output temperature effect thereof to the level as set by the bellows construction 35. Conversely, should the output temperature effect of the heat exchanger 21 fall below the set temperature of the process bellows 35, the fluid in the chamber 39 contracts so as to move the beam 29 closer to the vent opening 31 and increase the pressure of fluid in the conduit 32 and, thus, increases the pressure of the fluid in the chamber 27 of the pneumatic actuator 26 so as to move the valve member 25 farther away from the valve seat 24 and thereby permit an increased flow of steam through the heat exchanger 21 to increase the output temperature effect thereof.

Thus, the positioning of the balance beam 29 relative to the vent opening 31 tends to maintain the output temperature effect of the heat exchanger 21 at the output temperature effect setting for the process bellows 35.

Such proportional mechanism 30 can be seen inside the casing 41 of the controller 20 in FIG. 2 where the cover 42 of the controller 20 has been moved to the open position and, in a manner well known in the art, the temperature setting of the process bellows 35 and/or proportional mechanism 30 is under the control of a set point index link 43 that is adapted to automatically change the temperature setting of the proportional mechanism 30 upon movement of the set point index link 43 to change the output temperature effect of the heat exchanger 21 that is being controlled by the proportional mechanism 30 in a manner hereinafter described. Also, the process bellows construction 35 and/or proportional mechanism 30 is adapted to position a process pen link 44 of the controller 20 in relation to the actual output temperature effect of the heat exchanger 21 as being sensed by the bulb 40 even though the output temperature of the heat exchanger 21 may be at that particular time different than the intended setting thereof by the particular position of the set point index link 43.

In general, the controller 20 of this invention includes a bridge and pen assembly 45 which has an ink pen arm 46 positioned by the process pen link 44 so as to record on a rotatably driven chart 46' of the controller 20 the actual output temperature effect of the heat exchanger 21 in the process bath 21' before, during and after the operation of the heat exchanger 21. The pen and bridge assembly 45 also includes a high limit index or pointer 47 which is adapted to be set at a desired high limit temperature setting that the output temperature effect of the heat exchanger 21 is to reach by a selector knob 48 on the cover 42 of the casing 41 in a manner hereinafter described so that when the output temperature effect of the heat exchanger 21 reaches the output temperature setting of the high limit index 47, the controller 20, in a manner hereinafter described, will hold such output temperature effect for a predetermined length of time as set by a hold timer adjustment knob 49 that controls the setting of a hold timer motor 50 that is illustrated in FIG. 2 as well as in the electrical circuit 51 for the controller 20 in FIG. 14.

The bridge and pen assembly 45 includes a set point index or pointer 52 which is adapted to be set at a desired starting output temperature effect for a time schedule control of the system 22 by the controller 20 by an adjusting knob 53 on the cover 42 of the controller 20 in a manner hereinafter described, such setting of the set point index 52 setting the position set point index link 43 to initially set the proportional mechanism 30 to tend to maintain the output temperature effect of the heat exchanger 21, when the system 22 is subsequently set into operation, at the initial output temperature effect setting of the index 52.

A rate of rise adjustment knob 54 on the cover 42 of the controller 20 is adapted to be set at a desired rate of rise of temperature so that once the set starting temperature effect of the heat exchanger 21 has been reached, the index 52 will cause the output temperature effect of the heat exchanger 21 to continuously rise at the set rate of the knob 54 until the output temperature effect of the heat exchanger 21 reaches the high limit output temperature effect setting of the index 47. When the high limit output temperature effect is reached, the same will then be held by the controller 20 for the length of time set on the hold timer 50 by the knob 49. The rate of rise adjusting knob 54 of the controller 20 sets the rate of rise timer motor 55 of the circuit 51 at the desired rate of rise setting thereof for the previously described purpose.

The cover 42 of the controller 20 includes a manually operated, electrical power on-off switch button 56 which controls a pair of switches 57 and 58 in the circuit 51 and respectively disposed in the fused power source lines $L_1$ and $L_2$ so that when the button 56 is moved to an "on" position thereof, the switches 57 and 58 respectively close and interconnect the fused power source lines $L_1$ and $L_2$ to leads 59 and 60. However, when the button 56 is moved to the "off" position thereof, the same opens the switches 57 and 58 to respectively disconnect the power source lines $L_1$ and $L_2$ from the leads 59 and 60.

A start cycle button 61 is provided on the cover 42 of the controller 20 and, when pushed to start a particular cycle of operation in the manner hereinafter described, will cause the hold timer 50 of the circuit 51 to latch the normally closed relay contacts 50' in an open position thereof while latching the normally open relay contacts 50'' in a closed condition thereof.

A selector switch 63 and an electro-pneumatic (E/P) valve 64 are combined in one assembly 65 inside the casing 41 of the controller 20 as illustrated in FIG. 2 with the selector switch 63 being illustrated in the circuit 51 of FIG. 14 as being movable from the automatic setting position thereof illustrated in FIG. 14 against a contact 66 to a manual position thereof against a contact 67 for a purpose hereinafter described. However, when the selector switch 63 is moved to the automatic position illustrated in FIG. 14, an operator can control the system 22 by the controller 20 by merely setting the high limit index 47 by the knob 48 to the temperature at which the set point index 52 is to stop at the end of its travel and the set point index 52 is then positioned to the desired initial temperature setting by the knob 53. The operator then adjusts the timer 55 by the knob 54 to the desired rate of rise of temperature for the system 20 and adjusts the hold timer 50 by the knob 49 to the desired hold period of the final temperature whereby once the power switch 56 is in the on position and the start button 61 is actuated, the controller 20 will cause the valve 23 to operate the heat exchanger 21 in such a manner that once the initial output temperature effect of the heat exchanger 21 reaches the start temperature of the set point index 52, the set point index 52 will be moved by the timer 55 in a manner hereinafter described at a set rate of rise to cause the heat exchanger 21 to have the output temperature effect thereof rise at a certain rate until the output temperature effect reaches the setting of the high limit index 47 at which time the timer motor 50 will then begin to operate and hold the output temperature effect of the heat exchanger 21 at the output temperature effect setting of the high limit index 47 for the length of time that the hold timer 50 has been set by the knob 49. At the lapse of such hold time period, the control circuit 51 will then automatically shut down the system 22.

It is well known that such time scheduled controlled systems can be utilized for various purposes, such as maintaining a dye bath for textiles and the like at the desired rate of rise in temperature and then at the desired hold temperature thereof for a pre-selected time period.

While one of the features of this invention is to provide improved means for the controller 20 to cause the controller 20 to perform the aforementioned time schedule control of the system 22 and such means is provided by the pen and bridge assembly 45 later to be described, it is believed necessary to further describe the system 22 and the circuit 51 in order to fully understand the operation of the controller 20 when utilizing the various features of this invention.

Accordingly, as illustrated in FIG. 13, the system 22 has the portion thereof disposed within the dash-dotted rectangle 68 physically disposed within the casing 41 of the controller 20 wherein the conduit 32 for the supply pressure 33 has a branch conduit 69 leading therefrom in advance of the restrictor 34 for supplying supply pressure to a conventional amplifying pneumatic relay 70.

The amplifying pneumatic relay 70 is adapted to direct its output pressure into a conduit 71 with such output pressure being proportional to but an amplification of the signal pressure being received thereby from a conduit 72 interconnected to the conduit 32 downstream from the restrictor 34. Thus, the relay 70 senses and amplifies the pressure in the line 32 downstream from the restrictor 34 which pressure is in relation to the amount of opening or closing of the vent nozzle 31 by the balance beam 29 so that such output pressure in line 71 and being directed by the conduit 73 not only to the chamber 27 of the pneumatic actuator 26 for the main steam valve 23, but also to the chamber 74 of the feedback bellows 36 is in relation to the amount of opening or closing of the nozzle 31 by the balance beam 29. Thus, a movement of the beam 29 away from the nozzle 31 by the process bellows 35 sensing a temperature effect of the bath greater than the particular setting of the set point index line 43 causes a corresponding drop in pressure in the conduit 32 downstream from the restrictor 34 so that the amplifier 70 has its output pressure 71 correspondingly decreased whereby the valve member 25 moves closer to the valve seat 24 to decrease the output temperature effect of the heat exchanger 21. However, since the pressure in the chamber 74 of the feedback bellows 36 correspondingly decreases, the same tends to move the beam 29 back toward the nozzle 31 to thereby increase the pressure in the line 32 and, thus, the relay 70 to cause an increase in the output pressure 71 thereof to tend to open the valve member 25 away from the valve seat 24 whereby the feedback arrangement 36 tends to eliminate an overshooting of the control of the heat exchange 21 in a manner well known in the art. Thus, it is sufficient to state that the controller 20 for the system 22 is adapted to maintain the output temperature effect of the heat exchanger 21 at the start temperature setting of the set point index 52 and maintain such output temperature effect at a rate of rise that the index 52 is being moved by the rate of rise timer 55 in a manner hereinafter described because the position of the set point link 43 determines the temperature setting for the proportional mechanism 30 at any one time in the operation of the system 22 by the controller 20.

The conduit 32 downstream from the restrictor 34 of the system 22 is interconnected by a conduit 75 to a vent nozzle 76 that is opened and closed by a valve member 77 carried on a flapper armature 78 of the E/P valve 64. The armature 78 is normally urged to an open position by a spring means 79 in FIG. 13 and an electrical coil 80, when energized, is adapted to attract and pull the armature 78 downwardly in opposition to the force of the spring 79 and have the valve member 77 close the vent opening 76 as long as the coil 80 is energized. However, when the coil 80 is de-energized, the spring means 79 moves the valve member 77 away from the vent opening 76 to open the conduit 32 so that no pressure build-up can occur in the line 32 and, thus, in the output line 71 of the relay 70 so that the main stream valve 23 will automatically close by the force of the spring 28 whenever the vent nozzle 76 is in an open position. Thus, it requires the energizing of the coil 80 to close the vent nozzle 76 in order to permit the main steam valve 23 to be operated by the controller 20 in the manner previously described.

The E/P valve 64, while illustrated schematically in FIG. 13, is illustrated in detail in FIG. 12 and it can be seen that the vent nozzle 76 thereof comprises a tubular member 81 passing through the center of the electrical coil 80 and the armature or flapper 78 when moved to the open position by the spring 79 abuts against a stop arm 82 of an L-shaped frame member 83 that has one leg 84 thereof interconnected to the tension spring 79 with the other end of the tension spring 79 being interconnected to the armature 78. Thus, when the coil 80 is energized, the armature 78 is pulled downwardly to close the upper end of the tube 81 and permit a pressure build-up in the line 75 and, thus, in the main control line 32 for the reasons previously set forth.

Figure 14:
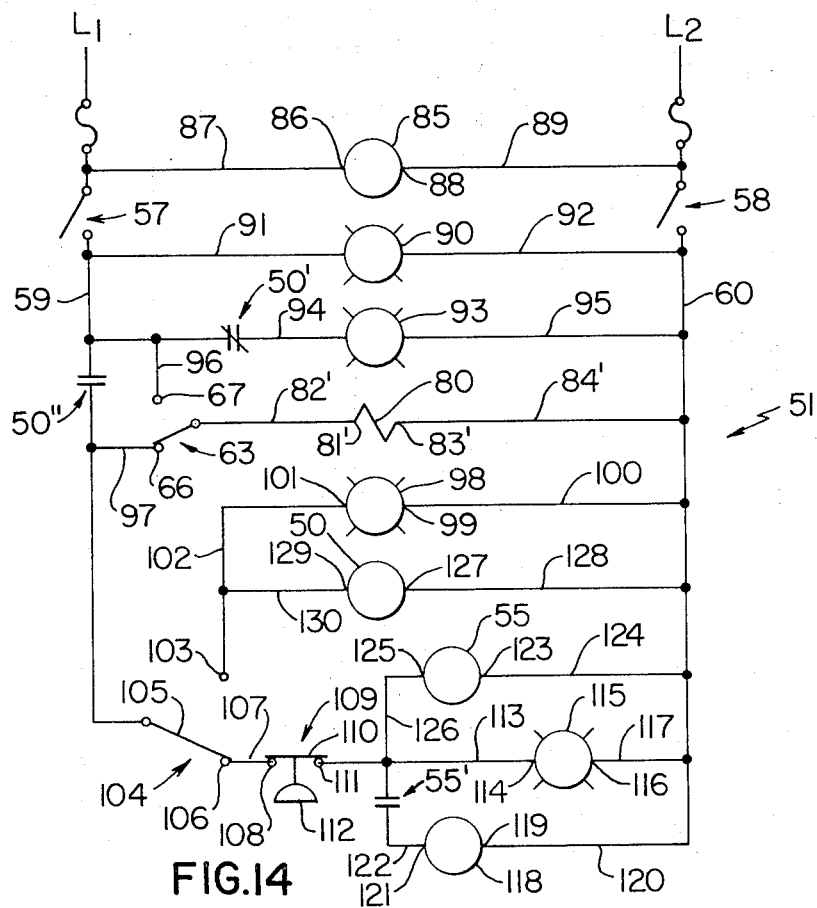
FIG. 14 is a schematic view illustrating the electrical circuit for the time schedule controller of this invention.

As illustrated in FIG. 14, the coil 80 for the E/P valve 64 is adapted to have one side 81' thereof interconnected by a lead 82' to the selector switch 63 and the other side 83 thereof interconnected by a lead 84' to the lead 60 of the circuit 51.

A chart drive motor 85 is adapted to have one side 86 thereof interconnected to the power source lead $L_1$ by a lead 87 and the other side 88 thereof interconnected by a lead 89 to the power source lead $L_2$ so that whenever the controller 20 is plugged into a power source, such as a conventional 110 volt alternating current source, the chart 46' of the controller 20 is driven by the chart drive motor 85 at a continuous rate so that the ink pen 46 continuously records thereon the actual sensed output temperature effect of the process bath 21' even though the controller 20 is not operating the heat exchanger 21 and the main steam valve 23 is disposed in its closed position. A pilot light 90 is placed across the leads 59 60 by leads 91 and 92. Similarly, an end of cycle light 93 is placed across the leads 59 and 60 by leads 94 and 95. However, the lead 94 has the normally closed relay contacts 50' therein for a purpose hereinafter described and the contact 67 for the selector switch 63 is interconnected by a lead 96 to the lead 94 intermediate the main lead 59 and relay contacts 50'. The contact 66 for the selector switch 63 is interconnected to the lead 59 by a lead 97.

A hold light 98 has one side 99 thereof interconnected to the lead 60 by a lead 100 while the other side 101 thereof is interconnected by a lead 102 to a normally open contact 103 of a limit switch 104 which forms part of the pen and bridge assembly 45 later to be described.

A switch blade 105 of the switch 104 is interconnected to the lead 59 and normally is disposed against a contact 106 to electrically interconnect the lead 59 to a lead 107 that is interconnected to a contact 108 of a pneumatically operated switch 109. The switch 109 has its switch arm 110 normally bridging the contact 108 with a contact 111 as long as the pneumatic sensor 112 thereof senses that the output pressure from the relay 70 to the pneumatically operated valve 23 does not exceed a full open pressure which in the system 22 is a pressure above 15 psi. Since the control range for the output pressure from the relay 70 to the steam valve 23 is normally 3 to 15 psi, the switch 109 is normally disposed in its closed position bridging the contacts 108 and 111 unless the same senses a pressure above 15 psi.

The contact 111 is interconnected by a lead 113 to one side 114 of a rate of rise light 115 while the other side 116 thereof is interconnected by lead 117 to the lead 60. A drive motor 118 for moving the set point index 52 in a manner hereinafter set forth has one side 119 thereof interconnected by a lead 120 to the lead 60 and the other side 121 thereof interconnected by a lead 122 to normally open relay contacts 55' of the rate of rise timer motor 55. The rate of rise timer motor 55 opens and closes the contacts 55' on a percentage of time basis during the running of the rate of rise timer motor 55 so that the closing percentage of the contacts 55' may be varied by the setting of the rate of rise adjustment knob 54 on the controller 20 whereby the timer 55 will operate the drive motor 118 in an on and off manner to move the set point index 52 at the desired rate of rise thereof as will be apparent hereinafter.

The rate of rise timer motor 55 has one side 123 thereof interconnected to the lead 60 by a lead 124 while the other side 125 thereof is interconnected to the lead 113 by a lead 126 that is also connected to one side of the normally open relay contacts 55' of the timer motor 55. The hold timer motor 50 has one side 127 interconnected by a lead 128 to the lead 60 while the other side 129 thereof is interconnected by a lead 130 to the lead 102.

As illustrated in FIGS. 3–8, the bridge and pen assembly 45 includes a pair of bridge members or frame plates 131 and 132 for mounting the bridge and pen assembly 45 in the controller casing 41, the upper bridge member 131 being supported on the lower bridge member 132 by a plurality of posts 133. A cylindrical pin 134 is carried by the bridge plates 132 and 131 and does not rotate relative thereto as the same is held in place by set screws such as at 135, FIG. 4A. A bushing 136 is carried by the upper bridge member 131 and has the pin 134 passing therethrough beyond the top beveled surface 137 thereof.

Figures 4, 4A:
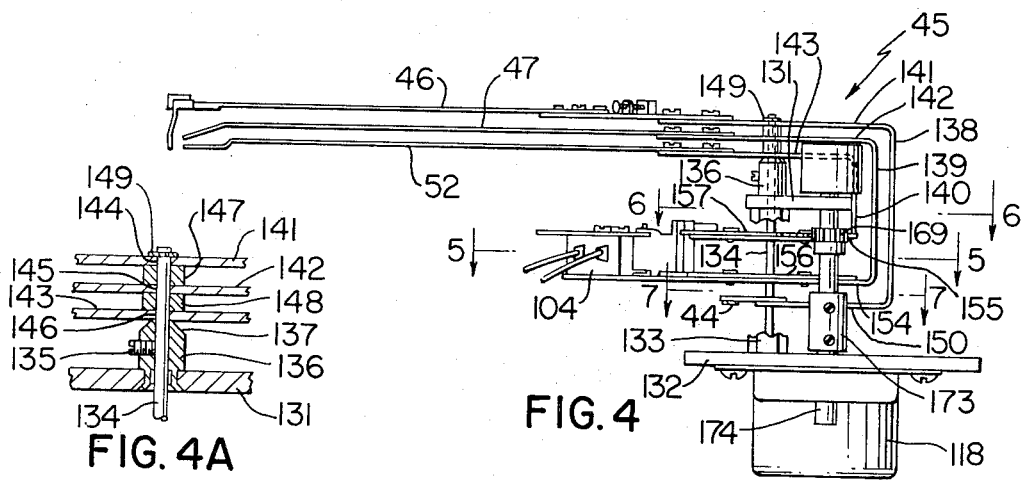
FIG. 4 is a side view of the bridge and pen assembly of FIG. 3.
FIG. 4A is an enlarged fragmentary cross-sectional view taken substantially on line 4A—4A of FIG. 3.

The pen 46, the high limit index 47 and the set point index 52 respectively have U-shaped parts 138, 139 and 140 with the upper arms 141, 142 and 143 thereof provided with openings 144, 145 and 146 passing therethrough and receiving the portion of the pin 134 that projects beyond the bushing 136, as illustrated in FIG. 4A. Spacers 147 and 148 are respectively disposed on opposite sides of the intermediate arm 142 of the high limit index 47. The arms 141–143 are held in the stacked relation illustrated in FIGS. 4 and 4A by a retaining ring 149 and the pin 134 is adjusted such that a gap of approximately 0.010 of an inch exists between the pen arm 141 and the retaining ring 149 when all of the leverage members 141–143 are in the downward position, as illustrated in FIG. 4, whereby sufficient end play is provided to prevent any possibility of binding of the leverage members 141–143 in their rotation on the pin 134.

The U-shaped member 138 for the pen 46 has the lower arm 150 thereof provided with an opening 151 passing therethrough and receiving the pin 134 intermediate the bridge members 131 and 132, as illustrated in FIG. 7. A link 152 also has an opening 153 passing therethrough and receiving the pin 134 with the link 152 being fastened to the arm 150 of the pen assembly 46 so that movement of the link 152 by the interconnected process pen, link 44 will cause the pen 46 to pivot or rotate on the pin 134 and mark across the chart 46' as the chart 46' is being driven by its drive motor 85.

The lower legs 154 and 155 of the U-members 139 and 140 for the indexes 47 and 52 respectively receive the pin 134 through suitable openings therein with such arms 154 and 155 respectively being riveted as illustrated to gear-cam members 156 and 157 likewise disposed for rotation on the pin 134 at openings 158 and 159 passing respectively therethrough.

The gear-cams 156 and 157 can be produced from like stampings or can be slightly modified from each as will be apparent hereinafter. However, such gear-cam members 156 and 157 respectively rotate with the indexes 47 and 52 on the pin 134 so that the gear-cam members 156 and 157 comprise alignable members for the indexes 47 and 52 as will be apparent hereinafter.

Figures 5, 6:
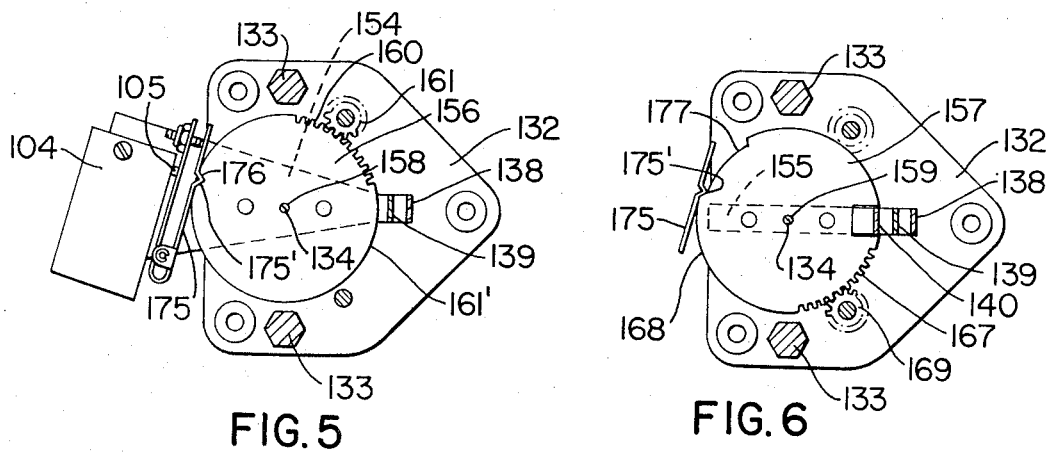
FIG. 5 is a fragmentary, cross-sectional view taken on line 5—5 of FIG. 4.
FIG. 6 is a fragmentary, cross-sectional view taken on line 6—6 of FIG. 4.

As illustrated in FIG. 5, the cam-gear member 156 for the high limit index 47 has a part 160 of the outer periphery 161' thereof formed with gear teeth thereon which are adapted to be disposed in meshing engagement with a pinion gear 161 fastened by a set screw 162, FIG. 8, to a shaft member 163 rotatably carried by the bridge members 131 and 132 and having an extension 164 passing through the upper bridge member 131 and being fastened by a set screw 165 to a knob member 166 adapted to rotate the shaft 163 in a manner hereinafter set forth.

Similarly, the cam-gear member 157 for the index 52 has a portion 167 of the outer periphery 168 thereof provided with gear teeth disposed in meshing relation with the gear teeth of a pinion gear 169 fastened by a set screw 170 to a shaft 171 mounted for rotation between the bridge plates 131 and 132 and likewise having a knob member 172 on the upper end thereof for adjusting the rotational position of the shaft 171 in a manner hereinafter described. However, the shaft 171 is also coupled by a coupling member 173 to an output shaft 174 of the set point drive motor 118 carried on the lower bridge member 132 as illustrated whereby when the drive motor 118 is energized in the circuit 51 of FIG. 14, the geared down output shaft 174 thereof rotates the shaft 171 and, thus, the pinion gear 169 to drive the cam-gear 157 about the pin 134 and, thus, rotate the index 52 about the pin 134 in unison therewith.

The arm 154 of the U member 139 for the high limit index 47 extends beyond the cam gear member 156 thereof and carries the limit switch 104 in fixed position thereon, the limit switch 104 having an operating plunger 105 which when in its out condition makes contact with the contact 106 of the circuit 51 and when caused to move inwardly by a cam follower 175 thereof being forced out of a recessed cam part 176 of the outer periphery 161' of the cam gear member 156, as illustrated in FIG. 5, causes the switch blade 105 of FIG. 14 to be moved out of contact with the contact 106 and placed into contact with the contact 103 for a purpose hereinafter described.

The cam follower arrangement 175 is so constructed and arranged that the same does not ride on the outer periphery 161' of the cam gear member 156 for the high limit index 47 but is movable into the recessed cam area 176 thereof. However, the cam follower 175 does ride in the elongated cam portion 177 of the gear member 157 when the same is rotating relative thereto.

The cam wheels or members 156 and 157 are so constructed and arranged that the cam follower 175' of the cam assembly 175 will be midway between the highest and lowest level of its cammed position as it rides out of the recess 177 of the member 157 toward the outer periphery 160 thereof when the indexes 47 and 52 are at their point of coincidence so that the snap acting switch 104 can be made to trip at the exact point of coincidence of the indexes 47 and 52. Further, both indexes 47 and 52 are capable of causing the switch 104 to trip as the result of the movement of the cam follower assembly 175 being driven toward the switch 104 by the ramping action of the cam gear 157 of the set point index 52 as it rotates clockwise in FIG. 6 and the point of switch actuation will be the alignment of the assemblies 47 and 52 to force the cam follower 175' out of the cam 176 of the gear cam 156 for the high limit index 47 and tend to ride on the high portion of the outer periphery 161' of the gear cam 157 of the set point index 52.

Therefore, it can be seen that when the high limit index 47 has been set to a desired position thereof by the rotation of the pinion gear 161 rotating the cam gear member 156 and, thus, the high limit index 47, the switch 104 is being positioned therewith so that the set point index 52 when driven by the motor 118 into a position of coincidence with the high limit index 47 will have its cam 157 operate the snap switch 104 to move the contact from the contact 106 to the contact 103 for a purpose hereinafter described to start the hold time of the control circuit 51.

As previously stated, movement of the set point index 52 by the motor 118 causes the set point link 43 that is interconnected to the set point index 47 to adjust the proportional mechanism 30 to cause the output temperature effect of the heat exchanger 21 to follow the new setting of the index 52 as the same is being driven toward the high limit setting of the index 47 at which point the indexes 52 and 47 will be in coincidence so that the cam-gear 157 can operate the limit switch 104 from the position illustrated in FIG. 14 to open the contact 106 and close the contact 103 for a purpose hereinafter described.

In order to initially adjust the positions of the shafts 163 and 171 to respectively set the high limit position for the index 47 and the starting position for the set point index 52, the adjustment knobs 48 and 53 on the cover 42 of the controller casing 41 are formed in a like manner to respectively control the inside knobs 166 and 172 on the shafts 163 and 171.

Since such structure is identical, only one such structure is illustrated in FIGS. 9–11 and, since the same comprises the adjusting knob 48 for the high limit index 47, it is to be understood that like structure is provided for the knob 53 to adjust the initial position of the set point index 52.

As illustrated in FIG. 9, the cover 42 has a sleeve 178 passing therethrough and receiving a cylindrical portion 179 of a rectangularly cross sectioned rod 180 that has the non-cylindrical portion thereof extending below the sleeve 178 and passing through a rectangular opening 181 in a plate 182 having a pair of outwardly directed, diametrically disposed tangs 183 adapted to respectively be received in diametrically opposed notches 184 formed through the knob 166 for the shaft 163 while the remainder of the plate 182 is received in a central recess 185 in the knob 166, as illustrated in FIG. 9. The plate 182 is held on the rod 180 by a threaded fastening member 186 and is urged against the head 187 of the threaded fastening member 186 by a compression spring 188 disposed between the sleeve 178 and the plate 182, as illustrated in FIG. 9, whereby the plate 182 is adapted to move up and down on the rod 180 in opposition to the force of the compression spring 188.

As illustrated in FIG. 9, the adjustment knob 48 is fastened to the cylindrical portion 179 of the rod 180 by a set screw 189 so that the knob 48 will rotate in unison with the rod 180.

After the cover 42 has been in the open position illustrated in FIG. 2 and, thereafter, is moved to its closed position as illustrated in FIG. 1 and locked in such position by suitable locking means 190, FIG. 1, should the tangs 183 of a plate 182 for a particular adjusting knob 48 or 53 be out of register with the slots 184 in the cooperating knob 166 or 172, as illustrated in FIG. 10, the tangs 183 merely engage against the upper surface 191, as illustrated in FIG. 10, permitting the plate 182 to telescope on the rod 180 in opposition to the force of the compression spring 188 in order to permit the cover 42 to move to its fully closed position. Thereafter, the operator merely rotates the particular knob 48 or 53 at least a quarter of a turn in any direction and the tangs 183 of the plate 182 will snap into the slots 184 under the force of the compression spring 188 in the manner illustrated in FIG. 11 as the same come into alignment with the notches 184 so that the interconnection between the outer knob 48 or 53 on the cover 42 to the respective inner knob 166 or 172 is a simple operation merely thereafter requiring rotation of the knobs 48 and 53 lock the tangs 183 in place. Thereafter, the knobs 48 and 53 will respectively adjust the indexes 47 and 52 in the manner previously described to set the same at the desired beginning positions thereof for a controlled operation for the system 22 as now to be described.

When the operator presses the power button 56 for the controller 20 to move the same to an on position thereof, the switches 57 and 58 are moved to their closed positions to interconnect the fused power source lines $L_1$ and $L_2$ to the leads 59 and 60 whereby the pilot light 90 is now turned on as the same is placed across the power source leads $L_1$ and $L_2$. If the selector switch 63 is in its "manual" position so as to be away from the contact 66 and against the contact 67, the coil 80 of the E/P valve 64 will be energized to close the valve member 77 against the vent nozzle opening 76 of the tubular member 81 whereby output pressure is provided from the relay 70 to the conduit 73 for controlling the main steam valve 23.

However, if an automatic operation for the controller 20 is provided, the selector switch 63 is disposed in the "automatic" position illustrated in FIG. 1 whereby the switch 63 is closing against the contact 66 so that current cannot be directed to the solenoid 80 until the normally opened relay contact 50'' are closed. Since the contacts 50'' are in the open position when the hold timer motor 50 is not timing and the contacts 50' thereof are in the closed position, as illustrated in FIG. 14, as is true before the beginning of each process run, the end cycle light 93 will be initially on as the same is energized through normally closed contacts 50'.

The operator then sets the high limit index 47 through the knob 48 to the desired temperature at which the set point index 52 is to stop at its end of travel. The set point index 52 is then positioned by the knob 53 to the desired initial temperature setting that the controller 20 is to control the heat exchanger 21. Thus, the limit switch 104 is moved to a certain position when the high limit index 47 is so moved to a set position and the cam gear 157 for the set point index 52 is moved to a certain beginning position thereof so that the cam follower 175' is in its outermost position whereby the limit switch 104 has its blade 105 against the contact 106, as illustrated in FIG. 14.

The operator then adjusts the rate of rise adjustment knob 54 to the desired rate of rise temperature that the set point index 52 is to control the heat exchange 21 in reaching the high limit temperature setting of the high limit index 47. The operator then sets the hold timer knob 49 to the desired length of time that the high limit temperature for the heat exchanger 21 is to be maintained by the controller 20.

After all of the aforementioned selections have been made, the operator then depresses the start button 61 which acts on the hold timer 50 to latch the contacts 50' in an open position thereof and the contacts 50'' thereof in a closed position thereof whereby the end of cycle light 93 now goes out.

If the selector switch 63 is in the "auto" position illustrated in FIG. 14, the coil 80 of the E/P valve 64 will now be energized since the contacts 50'' are closed allowing the steam valve 23 to open to begin to heat the desired process material by the heat exchanger 21. As long as the pressure operated switch 109 is closed, electrical current is applied to the rate of rise timer motor 55, rate of rise light 115 and set point drive motor 118. However, the running time of set point drive motor 118 is regulated by the closing interval of the contacts 55' which is a function of the percentage of the operation of the timer 55 whereby the averate rate at which the set point index 52 is driven by the timer motor 118 up scale by the motor 118 toward the high limit index 47 is determined by the setting of the knob 54 for the rate of rise selection.

If the pneumatically operated switch 109 should open, the rate of rise timer 55 and set point drive motor 118 cannot run and set point index 52 will not rise. The pressure operated switch 109 is usually calibrated to open only at output pressures above 15 psi and the control range of output pressure for the controller 20 is normally 3 to 15 psi. On the reverse acting steam valve 23, the output pressure increases in the chamber 27 when more heat is demanded and most steam valves are wide open at pressures exceeding 15 psi. When the process is incapable of rising at the rate of movement of the set point index 52, the output pressure will exceed 15 psi and will cause the pressure operated switch 109 to open. By appropriate choice of proportional band setting and/or pressure switch setting, the actual permissible process lag may be varied according to need.

The rise of the set point index 52 by the timer motor 118 will continue in the manner previously described to cause the output temperature effect of the heat exchanger 21 to continuously increase until the switch 104 is tripped by the alignable members 157 and 156 for the indexes 52 and 47 being coincident as previously described so that the blade 105 of the switch 104 now moves away from the contact 106 and is placed against the contact 103. Such position of the switch 104 completely disconnects the set point drive motor 118 and timer 55 from across the power source L₁ and L₂ to terminate further up scale movement of the set point index 52 and, thus, increase of output temperature effect of the heat exchanger 21.

At this time, the power source 61 and 62 is now applied to the hold light 98 and to the hold timer motor 50 whereby the timer motor 50 will continue to run for the time period as set by the knob 49 so that the output temperature effect of the heat exchanger 21 is maintained at the high limit temperature setting of the high limit index 47 for this timed period as the set point index 52 is now stationary at this high temperature setting so as to maintain the controller 30 at the high temperature setting through the now stationary link 43 thereof.

When the hold timer 50 runs down, the hold timer contacts 50' and 50'' are reversed so that the contacts 50' now close and the contacts 50'' open whereby the end of cycle light 93 is turned on, the hold light 98 goes off and the timer motor 50 stops running.

If the selector switch 63 is in the "automatic" position as illustrated in FIG. 14, the E/P valve coil 80 is now de-energized since the contacts 50'' are open and the controller output pressure falls to zero through the movement of the valvve member 77 away from the valve nozzle 76 of the E/P valve 64 and the heat exchanger 21 will now return the process to a "shut down" condition thereof.

However, if the selector switch 63 was in a manual position so that the same was against the contact 67 rather than against the contact 66, the coil 80 for the E/P valve will remain energized even though the timer motor 50 is turned off and the process will not shut down whereby shut down must then be affected by the use of the power switch 56 being turned to the off position at the discretion of the operator.

Therefore, it can be seen that a unique means is provided for providing an automatic cycle of operation of the controller 20 to control the system 22 in such a manner that the rise of the set point index 52 from an initial setting thereof to a high temperature setting coincident with the setting of the high limit index 47 will cause the heat exchanger 21 to be held at such high limit output temperature effect for a timed period so that when the timed period has elapsed, an automatic shut down of the process will be completed. Also, it can be seen that improved parts for such a time schedule controller have been provided.

While the form of the invention now preferred has been disclosed as required by the patent statutes, other forms may be utilized all coming within the scope of the appended claims.

What is claimed is:

1. In a time schedule controlled system wherein a high limit index of a time schedule controller is adapted to be set at a desired temperature condition and the rate of rise of a set point index of said controller is adapted to be selected so that said controller will tend to maintain an output temperature effect of a controlled heat exchanger device at the selected rate of rise of said set point index until the output temperature effect reaches said set condition of said high limit index, the improvement wherein said high limit index and said set point index respectively have means movable therewith and alignable in relation to each other only when said set point index reaches the setting of said set high limit index, and actuator means for terminating the operation of said set point index in the rate of rise thereof when said actuator means is actuated and causing said heat exchanger to thereafter maintain the output temperature effect thereof at said set high limit for a selected time period, said alignable means of said high limit index and said set point index being operatively associated with said actuator means to actuate the same only when said alignable means are in said aligned relation thereof.

2. In a time schedule controlled system as set forth in claim 1, the further improvement wherein said alignable means of one of said indexes comprises a movable cam movable in unison with its respective index.

3. In a time schedule controlled system as set forth in claim 2, the further improvement wherein said indexes are respectively rotatable about a fixed axis, said cam also being rotatable about a fixed axis.

4. In a time schedule controlled system as set forth in claim 3, the further improvement wherein the other of said indexes carries said actuator whereby said actuator comprises said alignable means thereof.

5. In a time schedule controlled system as set forth in claim 4, the further improvement wherein said actuator means comprises an electrical switch.

6. In a time schedule controlled system as set forth in claim 1, the further improvement wherein said controller has a pair of adjusting means for respectively adjusting the settings of said indexes, said adjusting means being respectively and operatively interconnected to said alignable means for adjusting the respective indexes.

7. In a time schedule controlled system as set forth in claim 6, the further improvement wherein said adjusting means each comprises a gear member, said alignable means each comprising a gear part disposed in meshing relation with its respective gear member.

8. In a time schedule controlled system as set forth in claim 1, the further improvement wherein one of said alignable means comprises said actuator means and the other of said alignable means actuating said actuator means when aligned therewith.

9. In a time schedule controlled system as set forth in claim 8, the further improvement wherein said actuator means comprises an electrical switch having an operating plunger, said other alignable means acting on said plunger to move the same when in alignment with said one alignable means.

10. In a time schedule controlled system as set forth in claim 9, the further improvement wherein said other alignable means comprises a cam movable with its respective index and acting on said plunger of said switch.

* * * * *